United States Patent [19] — [11] 4,216,377
Hasegawa et al. — [45] Aug. 5, 1980

[54] LIGHT SCATTERING SMOKE DETECTOR

[75] Inventors: Mitsuo Hasegawa, Tokyo; Yoshinori Shinohara, Tama; Takashi Suzuki, Tokyo; Akira Yokota, Hino, all of Japan

[73] Assignee: Nittan Company, Limited, Tokyo, Japan

[21] Appl. No.: 918,098

[22] Filed: Jun. 22, 1978

[30] Foreign Application Priority Data

Jun. 27, 1977 [JP] Japan ............................ 52-84479[U]
Jun. 27, 1977 [JP] Japan ............................ 52-84480[U]

[51] Int. Cl.[2] ............................ G01N 21/26
[52] U.S. Cl. ............................ 250/574; 356/338
[58] Field of Search ............................ 250/573, 574, 575; 340/628, 630; 356/438, 439, 338

[56] References Cited

U.S. PATENT DOCUMENTS

| | | | |
|---|---|---|---|
| 3,185,975 | 5/1965 | Kompellin | 340/630 |
| 3,868,184 | 2/1975 | Marsocci | 250/574 |
| 4,124,298 | 11/1978 | Steele | 356/439 |

*Primary Examiner*—David C. Nelms
*Attorney, Agent, or Firm*—Eugene E. Geoffrey, Jr.

[57] ABSTRACT

A smoke detector having a housing including openings for admission of smoke, a smoke detecting chamber within said housing with the wall of said chamber formed of spaced overlapping elements which form a serpentine path therebetween, means on one side of said chamber for emitting light into said chamber, a light detector adjoining and shielded from said light source and a conical reflector in said chamber and on a side opposite said light source and detector.

5 Claims, 3 Drawing Figures

LIGHT SCATTERING SMOKE DETECTOR

This invention relates to a light scattering type smoke detector which is typically used for fire alarm purposes, and especially to its structure for preventing direct irradiation of a light sensing element with reflected light from the inner walls of the detection chamber.

In a light scattering type smoke detector, light emitted from a light source located in a dark detection chamber is scattered by smoke particles entering the chamber and the scattered light is sensed by a light sensing element such as photocell also located in the same chamber. If the light reflected from the walls of the chamber enters the light sensing element directly, it may produce a noise level and thus reduce the sensitivity and reliability of the detector.

It has been the general practice to prevent reflection from the walls by applying light absorbing paint to the walls and/or to roughen the wall surfaces. However this has been not only insufficient for completely removing noisy random reflection but also significantly costly. Smoke detectors of this type disclosed by U.S. Pat. Nos. 3,231,748, 3,382,762, 3,383,670, 3,555,532 and 3,727,056 utilize special lens systems and/or light shielding arrangement for preventing the reflected light from entering the sensing element. However, such structures are complicated and generally expensive.

British Pat. No. 1,250,297 discloses a smoke detector of this type, in which the side wall of the detection chamber is composed of a plurality of vertical laminae in a variety of shapes and arranged so that there is no direct optical path from the exterior to the interior of the detection chamber and also that each exterior aperture is connected with the interior of the chamber by at least one flow path composed of rectilinear sections joined at obtuse angles. Although this structure may facilitate entrance of smoke particles into the detection chamber, it is complicated and costly. Moreover, not only some of the light is reflected back from the internal edges of the laminae, but also the external light may enter the detection chamber unless the laminae are coated with light absorbing material.

An object of this invention is to provide a light scattering smoke detector having a simple structure which minimizes the direct irradiation of the sensing element with the reflected light to improve signal-to-noise ratio of the device.

The light scattering smoke detector in accordance with this invention comprises a detection chamber composed of a substantially cylindrical side wall and first and second end walls closing the both ends of the side wall. According to a feature of this invention, the side wall is composed of a plurality of vertical laminae which are substantially same in geometry and arranged circularly at substantially equal intervals. Each of the laminae is shaped so as to have at least an acute vertical ridge directed toward the interior of the detection chamber and forms a serpentine path between the adjoining laminae. Thus, the smoke particles can enter the detection chamber freely but the light from the light source is not reflected back from the side wall to the light sensing element.

According to another feature of this invention, the light source and light sensing element are located at the first end wall and the second end wall is provided with a conical surface with the apex being directed toward the first end wall. This conical surfce serves to reflect the light incident upon the second end wall toward the side wall so as to prevent it from being reflected back to the light sensing element.

According to a further feature of this invention, the conical surface of the second end wall is movable along the axis of the detection chamber. The movement of the conical surface varies the amount of light incident upon the light sensing element and, therefore, enables a sensitivity check of the device.

Other features and operation of the smoke detector of this invention will be described in more detail hereinunder with reference to the accompanying drawings.

IN THE DRAWINGS:

Throughout the drawings, like reference numerals are used to denote like structural components.

Figure 1:
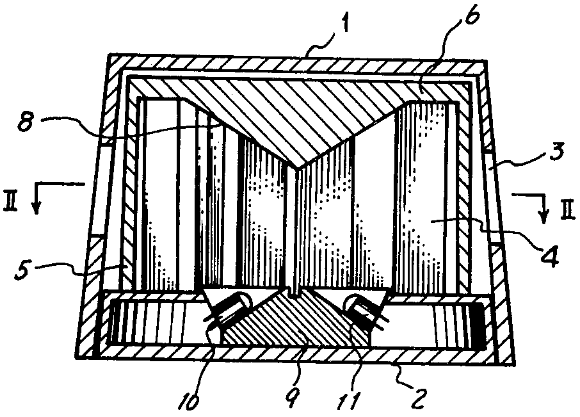
FIG. 1 is a cross-sectional view of one embodiment of a light scattering smoke detector according to this invention.

Referring to FIG. 1, the light scattering smoke detector in accordance with the invention includes a substantially frusto-conical cup-like housing 1 having the open end closed by a base member 2 which serves for mounting the device on a mounting surface such as a ceiling of a room. A plurality of windows 3 are formed in the side wall of the housing 1 for passage of smoke particles. Within the housing 1, there is a detection chamber 4 carried by the base member 2, which includes a cylindrical side wall 5 and a top wall 6.

Figure 2:
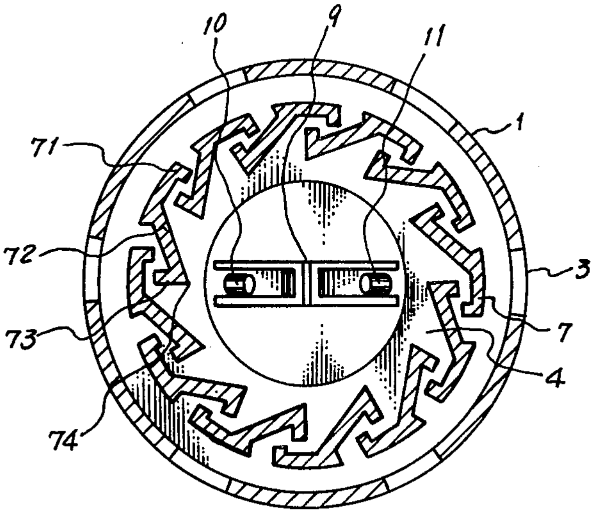
FIG. 2 is a cross-sectional view of FIG. 1 taken along the line 2—2 thereof.

As more clearly shown in FIG. 2, the side wall 5 consists of a plurality of vertical laminae 7 arranged circularly at equal intervals. The lamina each have a lateral cross-section comprising a first straight portion 71 facing the inner wall of the housing 1, a second straight portion 72 extending from an end of the first portion at an obtuse angle and a third portion 73 extending from the free end of the second portion at an acute angle to form a sharp knife-like ridge 74 directed toward the interior of the chamber 4.

The similarly shaped laminae 7 are arranged circularly as shown in FIG. 2 in partially superimposed fashion with each other to form serpentine paths therebetween. These serpentine paths permit passage of smoke from any direction but serve as a light trap for preventing the light incident upon the side wall 5 from being reflected back to the interior of the chamber 4 and also preventing the external light from entering in the chamber 4. It is preferable that each window 3 of the housing 1 faces to the first portion 71 of the lamina 7 so that the external light does not directly irradiate the entrance of the serpentine path.

On the top wall 6 of the detection chamber 4, there is a conical surface 8 which is coaxial with the chamber 4. As described below, this conical surface 8 serves to reflect the light from the light source toward the side wall 5.

Inside the base member 2, there is a ramp support 9 which supports a light source 10 and a light sensing element 11 so that the light emitted from the light source does not directly impinge on the light sensing element. Though not shown in the drawings, the light source 10 and light sensing element 11 are arranged to be connected to an appropriate power source and alarm circuit (not shown) respectively.

According to the abovementioned arrangement, unusable noisy light within the detection chamber 4 is almost completely trapped by the side wall 5 by the co-operation of the conical surface 8 and the laminae 7, so that the signal-to-noise ratio of the device is improved to twice or three times as compared with the prior art devices. Accordingly, this invention enables omission of usual dark light absorbing coatings of the components of detection chamber, that is, the surface of the components may be as produced and need not be processed in any way, such as roughened or coated. This feature simplifies the production process and facilitates maintenance of the device.

While the laminae may be made from metal sheets by die forming, they may be molded with synthetic resin integrally with the top wall 6. The base member 2 and the housing 1 may be of any suitable material such as metal or synthetic resin.

In the prior art smoke detectors of this type, activeness and sensitivity of the device have been examined by introducing smoke in the detection chamber or by applying a specific test voltage to a specific test voltage to a specific terminal of the detector. However, according to another embodiment of this invention such examinations can be carried out very easily without use of any additional means such as those referred to above.

Figure 3:
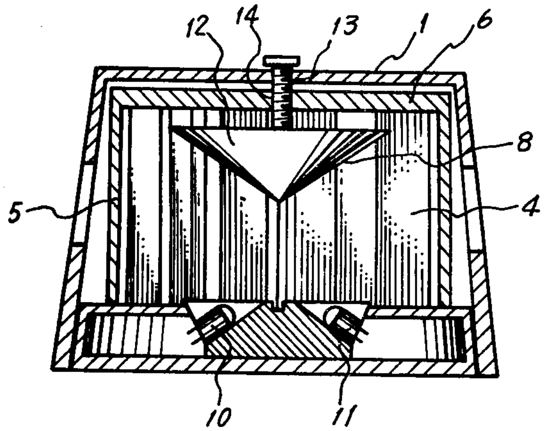
FIG. 3 is a cross-sectional view of another embodiment of light scattering smoke detector according to this invention.

Referring to FIG. 3, this embodiment is similar to that of FIG. 1 except that the tope wall 6 of the detection chamber 4 does not have a conical inner surface but is provided with a conical member 12 supported thereby. The conical member 12 has a conical surface 8 which is quite similar to that of FIG. 1 and is mounted on the top of a screw 13 which engages with a central screw hole 14 in the top wall 16 and projects out of the housing 1. As readily understood, by rotating the screw 13 from the outside of the housing 1, the conical member 12 is rotated and, at the same time, moved up and down along the axis of the detection chamber 4.

When the conical member 12 is moved down toward the light source 10 and light sensing element 11, a part of the light reflected by the conical surface 8 tends to enter the light sensing element 11 to actuate an alarm (not shown) even if there is no smoke in the chamber 4. Therefore, this provides a simple procedure for activeness and sensitivity examinations for each detector which has been secured in position, as compared with the abovementioned prior art method. Sensitivity control is also available by changing the vertical position of the conical member 12.

As described above, according to this invention, the light scattering smoke detector can be rendered not only simpler and more inexpensive in manufacture but also more sensitive and reliable in operation. In addition, means are provided for simpler performance examination.

It should be noted that the above description has been made for illustrative purpose only and various modifications and changes can be made without departing from the scope of this invention.

We claim:

1. A light scattering smoke detector comprising a detection chamber having a substantially cylindrical side wall and first and second end walls which close both ends of said side wall, a light source for emitting a light within said detection chamber, a light sensing element for sensing said light scattered by smoke particles entering the detection chamber, said light source and light sensing element being so located that said light source does not irradiate directly onto said light sensing element, said side wall comprising of a plurality of substantially identical spaced vertical laminae positioned at substantially equal circumferential intervals, each of said laminae being shaped to provide a straight portion and at least an angular knife-like ridge portion directed to the interior of said detection chamber and overlapping the straight portion of the adjoining laminae to form a serpentine path between the adjoining laminae, whereby the smoke particles can freely enter said chamber through said serpentine path and the light from said light source is effectively reflected out of said side wall but not back to said light sensing element.

2. A light scattering smoke detector, according to claim 1, wherein said light source and light sensing element are located at said first end wall and said second end wall is provided with a conical surface having its apex directed to said first end wall.

3. A light scattering smoke detector comprising a detection chamber composed of a substantially cylindrical side wall and first and second end walls which close the both ends of said side wall, means for admitting smoke into said chamber, a light source for emitting a light within said detection chamber, a light sensing element for sensing said light scattered by smoke particles, said light source and light sensing element being so located that said light source does not irradiate directly onto said light sensing element, said side wall comprising of a plurality of spaced vertical laminae which are substantially the same in geometry, each of said laminae being shaped so as to have at least an acute vertical ridge directed to the interior of said detection chamber to form a serpentine path between the adjoining laminae, whereby the smoke particles can freely enter said chamber through said serpentine path and the light from said light source is effectively reflected out of said side wall but not back to said light sensing element, said light source and light sensing element being located at said first end wall and said second end wall is provided with a conical surface having its apex directed to said first end wall and said conical surface being movable along the axis of said detection chamber.

4. A light scattering smoke detector, according to claim 1, wherein said lamina each have a lateral cross-section comprising a first straight portion facing the exterior of said detection chamber, a second straight portion extending from an end of said first portion at an obtuse angle and a third portion extending from the free end of said second portion at an acute angle to form a sharp ridge directed toward the interior of said detection chamber.

5. A light scattering smoke detector, according to claim 3, wherein said conical surface is formed on a conical member carried by a screw threadably engaging said second end wall.

* * * * *